US012808095B2

(12) United States Patent
Shin et al.

(10) Patent No.: US 12,808,095 B2
(45) Date of Patent: Nov. 24, 2026

(54) YARN MANUFACTURED BY RECYCLING SECONDARY BATTERY SEPARATOR

(71) Applicant: Rightroute Co. Ltd., Seoul (KR)

(72) Inventors: Min Jeong Shin, Seoul (KR); Jeong Woo Yoo, Seoul (KR)

(73) Assignee: RIGHTROUTE CO. LTD., Seoul (KR)

(*) Notice: Subject to any disclaimer, the term of this patent is extended or adjusted under 35 U.S.C. 154(b) by 0 days.

(21) Appl. No.: 19/002,095

(22) Filed: Dec. 26, 2024

(65) Prior Publication Data

US 2026/0085453 A1 Mar. 26, 2026

(30) Foreign Application Priority Data

Sep. 26, 2024 (KR) ........................ 10-2024-0130946
Dec. 24, 2024 (KR) ........................ 10-2024-0195690

(51) Int. Cl.

| | |
|---|---|
| ***D02G 3/06*** | (2006.01) |
| ***D02G 3/02*** | (2006.01) |
| ***D02G 3/36*** | (2006.01) |
| ***D02G 3/38*** | (2006.01) |
| *D06M 101/20* | (2006.01) |
| *H01M 10/54* | (2006.01) |

(52) U.S. Cl.

CPC ................. *D02G 3/06* (2013.01); *D02G 3/02* (2013.01); *D02G 3/36* (2013.01); *D02G 3/38* (2013.01); *D06M 2101/20* (2013.01); *D06M 2200/30* (2013.01); *D10B 2321/0211* (2013.01); *D10B 2331/04* (2013.01); *D10B 2401/063* (2013.01); *H01M 10/54* (2013.01)

(58) Field of Classification Search

CPC .. D02G 3/02; D02G 3/06; D02G 3/36; D02G 3/38

See application file for complete search history.

(56) References Cited

U.S. PATENT DOCUMENTS

| | | | | |
|---|---|---|---|---|
| 8,206,810 B1 * | 6/2012 | Harding | .................... | D01F 6/04 156/304.6 |
| 2004/0151905 A1 * | 8/2004 | Tsukamoto | .............. | D02G 3/06 428/373 |
| 2016/0145775 A1 * | 5/2016 | Ma | ............................ | D01F 6/04 57/260 |
| 2021/0301427 A1 * | 9/2021 | Tsukamoto | .............. | D02G 3/36 |

FOREIGN PATENT DOCUMENTS

| | | | | |
|---|---|---|---|---|
| CN | 104862843 A | | 8/2015 | |
| CN | 105624866 A | | 6/2016 | |
| EP | 0247952 A1 | * | 12/1987 | ............. B29C 67/00 |
| GB | 2569832 A | * | 7/2019 | ............... D02G 3/06 |

(Continued)

OTHER PUBLICATIONS

Translation EP 0247952.*

(Continued)

*Primary Examiner* — Shaun R Hurley
(74) *Attorney, Agent, or Firm* — Panitch Schwarze Belisario & Nadel LLP

(57) ABSTRACT

A composite yarn manufactured by recycling a waste separator for a secondary battery has one or more covering yarns covering a core yarn. The core yarn is formed by twisting a slit yarn having a width of 0.5 to 3 mm.

11 Claims, 4 Drawing Sheets

(56) References Cited

FOREIGN PATENT DOCUMENTS

| | | | | | |
|---|---|---|---|---|---|
| GB | 2571547 | A | * | 9/2019 | ............... B32B 1/00 |
| JP | H0610254 | A | | 1/1994 | |
| JP | H08174657 | A | | 7/1996 | |
| KR | 102607185 | B1 | | 11/2023 | |
| WO | 2021215190 | A1 | | 10/2021 | |

OTHER PUBLICATIONS

SKinno News, "Social enterprise Right Route introduces eco-friendly textile material made from recycled battery separators at Preview in Seoul 2021 fair," SK Innovation Newsroom, Sep. 1, 2021, 5 pages.
SKinno News, "[ESG partner] Right Route, an eco-friendly social enterprise aims to create sustainable fashion through upcycling battery separators," SK Innovation Newsroom, Jan. 20, 2021, 5 pages.
Extended European Search Report issued Jun. 20, 2025 in EP Application No. 24223314.6.
Office Action issued Feb. 17, 2026 in JP Application No. 2024-231148 with English Translation.

* cited by examiner

YARN MANUFACTURED BY RECYCLING SECONDARY BATTERY SEPARATOR

CROSS-REFERENCE TO RELATED APPLICATION

This application claims priority to and the benefit of Korean Patent Application No. 2024-0130946, filed on Sep. 26, 2024 and Korean Patent Application No. 2024-0195690, filed on Dec. 24, 2024, the disclosure of which is incorporated herein by reference in its entirety.

BACKGROUND

1. Field of the Invention

The present invention relates to a yarn manufactured by recycling a separator for a secondary battery.

The present invention is a result of a research project titled "Commercialization of yarn products for automobile interior materials manufactured by recycling ceramic-coated separator (CCS) for secondary batteries" conducted as a support project for small and medium-sized environmental enterprises (new green industries) by the Ministry of Environment. The project number is RQ2024010559, the project performance organization is Lightroot Co., Ltd., and the research period was Apr. 1, 2024, to Dec. 31, 2024.

2. Discussion of Related Art

The demand for lithium secondary batteries (hereinafter referred to as "secondary batteries") as a power source for not only mobile electronic devices but also various types of e-mobility due to their high energy density, discharge voltage, and output stability is rapidly increasing. These secondary batteries are composed of a positive electrode material, a negative electrode material, an electrolyte, and a separator configured to separate the positive electrode material and the negative electrode material.

The separator is a thin membrane in the form of a film or sheet made of an insulating material, and has a thickness of approximately 5 to 15 μm. The separator serves to block physical contact between the positive and negative electrode materials, and has a micro-porous structure including a large number of fine pores that act as channels through which lithium ions can move between the two electrodes.

The separator having such a structure has a structure similar to that of GORE-TEX® (an expanded polytetrafluoroethylene membrane), which is a functional material, and may thus achieve moisture-permeable and waterproof functions, and may be utilized as a functional material.

During the production process for manufacturing secondary batteries, separators are processed as defective due to defects such as microscopic scratches or discarded due to overproduction. The amount of such separators generated in the form of waste is gradually increasing along with the explosive growth of secondary batteries.

Nevertheless, the separators are not regenerated and are simply disposed of by an incineration or shredding method, which causes resource waste and environmental pollution.

To solve this problem, the applicant of the present invention has disclosed Korean Patent No. 10-2406934 (A Functional Fabric Recycling Separator Membrane of Secondary Battery and Manufacturing Method thereof).

The related art discloses a method of manufacturing an upcycled functional fabric, which includes:

(a) preparing separator sheets having a microporous structure that are discarded due to defective processing or overproduction in the production process for manufacturing a secondary battery;

(b) supplying each of the sheets such that an adhesive sheet is interposed between the separator sheet and a fabric sheet to be patched to the separator sheet; and (c) laminating the separator sheet and the fabric sheet such that they are bonded by melting of the adhesive sheet, wherein, in step (b), each of the sheets is supplied such that it maintains a constant tension, while the separator sheet, the adhesive sheet, and the fabric sheet are all supplied at the same speed, and in step (c), a laminated structure in which the separator sheet, the adhesive sheet, and the fabric sheet are laminated in that order is pressurized and laminated in a predetermined temperature atmosphere.

However, the above-described technology is applicable to lithium battery separators (LiBSs) among waste separators of secondary batteries, and is not applicable to heat-resistant coated separators such as ceramic-coated separators (CCSs), which are other types of waste separators.

CCS films are not only completely discarded because the CCS films cannot be recycled due to the influence of the ceramic components contained therein, but are not even subjected to downcycling. Therefore, there is an increasing need for technology capable of recycling the CCS films. If the recycling of such coated separators was possible, it would be expected to make a significant contribution to the disposal of separator waste.

RELATED-ART DOCUMENT

Patent Document

1. Korean Patent No. 10-2406934

SUMMARY OF THE INVENTION

The present invention is directed to providing a yarn manufactured by recycling a waste separator for a secondary battery.

According to an aspect of the present invention, there is provided a composite yarn having one or more covering yarns covering a core yarn, the core yarn being formed by twisting a slit yarn having a width of 0.5 to 3 mm.

the slit yarn including an ultrahigh molecular weight polyethylene (UHMWPE) layer; and a heat-resistant coating layer formed on one surface of the UHMWPE layer.

According to another aspect of the present invention, there is provided a method of manufacturing a composite yarn, which includes:

S1) applying twisting to a core yarn, which is a slit yarn including an ultrahigh molecular weight polyethylene (UHMWPE) layer; and a heat-resistant coating layer formed on one surface of the UHMWPE layer, through a drawing process;

S2) weaving a first covering yarn into the core yarn of step S1) while applying twisting to the core yarn; and S3) weaving a second covering yarn into the woven yarn of step S2) while applying twisting to the woven yarn, wherein the second covering yarn is woven in the opposite direction to the first covering yarn.

DETAILED DESCRIPTION OF EXEMPLARY EMBODIMENTS

Figure 1:
FIG. 1 is an image of a composite yarn manufactured in Example 1.

The present invention is directed to providing a yarn manufactured by recycling a waste separator for a secondary battery, and a composite yarn using the same.

Hereinafter, a yarn manufactured by recycling a waste separator according to the present invention, and a composite yarn will be described in more detail.

In the present invention, the yarn manufactured by recycling a waste separator is a slit yarn manufactured by recycling a separator for a secondary battery. Therefore, in the present invention, "recycled yarn" may be used interchangeably with "slit yarn."

In the present invention, the separator for a secondary battery is a heat-resistant coated separator film, and thus may have a structure in which one surface of an ultrahigh molecular weight polyethylene (UHMWPE) layer is coated with a heat-resistant coating layer.

Therefore, the slit yarn according to the present invention includes ultrahigh molecular weight polyethylene (UHMWPE); and a heat-resistant coating layer formed on one surface of the UHMWPE.

In one embodiment, the ultrahigh molecular weight polyethylene (UHMWPE) has a weight average molecular weight of 1,000,000 to 9,000,000 g/mol.

In one embodiment, the heat-resistant coating layer may include inorganic particles selected from the group consisting of ceramics, aluminum hydroxide, magnesium hydroxide, calcium oxide, magnesium oxide, alumina, Boehmite, aluminum hydroxide, titanium oxide, silica, zinc oxide, and clay; a heat-resistant polymer resin selected from the group consisting of polyacrylonitrile, polysulfone, polyamide, polytetrafluoroethylene, polyurethane, polyaramid, and cellulose acetate; or a combination of two or more types thereof. Specifically, the heat-resistant coating layer may include ceramics.

In one embodiment, the content of the heat-resistant coating layer in the slit yarn may be 20 to 50 parts by weight, or 30 to 40 parts by weight based on 100 parts by weight of the UHMWPE layer.

In present invention, the slit yarn may be manufactured by slitting a separator for a secondary battery.

In one embodiment, the slit yarn may be manufactured by slitting the separator using a separator-dedicated slitting cutter. In general, the stiffer the film, the easier it is to cut the film evenly and thinly, and it is difficult to cut a limp vinyl at an even interval. Therefore, the micro-slitting technology is applied to products with thickness and rigidity, such as metallic fibers. The waste separator film used in the present invention has a thickness of approximately 12 μm, and thus is a very thin film compared to the thickness (approximately 50 μm or more) of general films handled by conventional slitter machines. Therefore, when the conventional technology is used, problems such as separator breakage due to slitting tension, uneven slit spacing due to slipping, and the like may occur.

In the present invention, a slitting cutter, which is made of a high-strength material compared to the conventional slitting cutters, may be used to slit a separator film for a secondary battery into fine specifications at regular intervals. In particular, a slitter fix device is manufactured through self-design so that the error in the spacing of the slit yarn can be managed as "zero," and may be used as specialized equipment only for separators for a secondary battery.

Specifically, the slitting cutter of the present invention may use a method in which the separator is slit by an active rotation module of a blade equipped with a micro-cutter, rather than the conventional passive method in which the separator passes through a fixed cutter.

In one embodiment, the width of the slit yarn may be adjusted to 0.5 to 3 mm, 1 to 2.5 mm, 1.5 to 2.5 mm, or 2 mm or less.

In one embodiment, the thickness of the slit yarn may be 5 to 30 μm, 10 to 20 μm, or 15 μm or less. The slit yarn having the above-described width and thickness may be firmly wound with a constant tension by a micro-tension controller to maintain a stable yarn layer.

The slit yarn according to the present invention is used as a core yarn for a composite yarn.

In the present invention, the composite yarn includes a core yarn; and one or more covering yarns covering the core yarn.

In the present invention, the core yarn is a yarn located at the center of the composite yarn, and thus may serve to provide strength to the composite yarn and stably maintain its shape.

In one embodiment, the core yarn may have a thickness of 100 to 400 deniers.

In one specific embodiment, the core yarn may be lead-free (TPM 0) or may have a twisted structure. When the core yarn has a twisted structure, it may have a twist of 50 to 300 TPM, or 80 to 150 TPM per meter. In the present invention, a twisted structure may be imparted to the core yarn to improve the strength and uniformity of the composite yarn and enhance the resistance to friction.

In the present invention, the covering yarns are yarns configured to wrap around the core yarn. The covering yarns may impart functionality to the composite yarn, or may impart a design during the subsequent manufacture of fabrics.

In one specific example, one or more covering yarns, and specifically two or more covering yarns, preferably two covering yarns, may be used as the covering yarns. When two or more covering yarns are used, the covering yarns may be called a first covering yarn and a second covering yarn to distinguish them.

In one embodiment, the covering yarns may be yarns made of chemical fibers or natural fibers. The chemical fibers may be one or more composite materials selected from the group consisting of polyester, nylon, acryl, rayon, and polyethylene including UHMWPE, and the natural fibers may be one or more composite materials selected from the group consisting of cotton, wool, and silk.

In one embodiment, two covering yarns may be used, and one of the covering yarns that covers the core yarn first may be called a first covering yarn. In this case, the first and second covering yarns may be made of the same material or different materials.

In one embodiment, each of the first covering yarn and the second covering yarn may have a thickness of 50 to 300 deniers.

In one embodiment, the twist level of the first covering yarn may be 200 to 800 TPM based on 50 to 300 deniers, and the twist level of the second covering yarn may be 300 to 1,000 TPM based on 50 to 300 deniers. Specifically, the twist level of the first covering yarn and the second covering yarn may be 150 deniers on average.

In one embodiment, the first covering yarn may have an S-direction or Z-direction twist, and the second covering yarn may have an S-direction or Z-direction twist. In this case, the first covering yarn and the second covering yarn may have different twist directions. When the first covering yarn and the second covering yarn have different twist directions, it is possible to prevent the occurrence of snarling (a phenomenon of curling due to twisting) due to the torque dispersion effect caused by twisting.

In the present invention, the weight ratio of the core yarn and the covering yarns may be 90:10 to 30:70, 70:30 to 50:50, or 60:40 to 50:50.

Also, the weight ratio of the first covering yarn and the second covering yarn may be 50:50 to 30:70. When the weight ratio is out of the above range, there may be a problem of causing a decrease in uniformity and twisting due to imbalance caused by denier deviation between yarns.

In the present invention, the composite yarn may have a thickness of 150 to 700 deniers.

Also, in the present invention, the composite yarn may have a strength of 1 to 30 g/d or 1 to 10 g/d. Within the above strength range, the composite yarn may be provided with stable weaving properties without causing the breakage of the composite yarn. The strength may be measured by a method of examining the strength of a yarn according to the KSK 0412:2022 test method.

In the present invention, the composite yarn may have an elongation of 10 to 30% or 20 to 25%. Within the above elongation range, a drape property may be imparted to the woven fabrics. The elongation may be measured by a method of examining the elongation (%) of a yarn according to the KSK 0412:2022 test method.

In the present invention, the composite yarn may have a dimensional change rate of 0.5 to 10%. A stable washing shrinkage rate may be imparted at the dimensional change rate. The dimensional change rate may be measured by a method of drying the resultant fabric woven into the separator yarn at a washing temperature of approximately 41° C. on a clothesline according to the KSK ISO 6330:2012,5B test method.

The present invention is also directed to providing a method of manufacturing the above-described composite yarn.

The method of manufacturing a composite yarn according to the present invention may include:

S1) applying twisting to a core yarn, which is a slit yarn including an ultrahigh molecular weight polyethylene (UHMWPE) layer; and a heat-resistant coating layer formed on one surface of the UHMWPE layer, through a drawing process;

S2) weaving a first covering yarn into the core yarn of step S1) while applying twisting to the core yarn; and S3) weaving a second covering yarn into the woven yarn of step S2) while applying twisting to the woven yarn.

In the present invention, step S1) is a step of applying twisting to a core yarn, which is a slit yarn including an ultrahigh molecular weight polyethylene (UHMWPE) layer; and a heat-resistant coating layer formed on one surface of the UHMWPE layer, through a drawing process. In this step, the slit yarn in a flat state may be allowed to form a central axis of the composite yarn in a stable shape and position.

In one embodiment, the draw ratio during the drawing process may be 1.0 to 1.4 DR or 1.1 to 1.2 DR.

In one embodiment, the core yarn may be lead-free (TPM 0) or may be drawn to have a twist level of 50 to 300 TPM per meter.

Also, in one embodiment, a heat treatment process may be further performed at 100 to 120° C. or 100 to 110° C. after drawing. The shape of the core yarn may be fixed through the heat treatment process.

In the present invention, step S2) is a step of weaving a first covering yarn into the core yarn of step S1) while applying twisting to the core yarn. In this step, the covering yarns may be introduced while applying an optimal TPM in one direction so that snarling does not occur.

In one embodiment, the first covering yarn is a yarn made of chemical fibers or natural fibers, and the materials described above may be used.

In one embodiment, the first covering yarn may be applied at a twist level of 200 to 800 TPM or 250 to 500 TPM based on 50 to 300 deniers. Specifically, the twist level may be 150 deniers on average.

In one embodiment, step S2) may be performed at 90 to 140° C. or 100 to 120° C.

In the present invention, step S3) is a step of weaving a second covering yarn into the woven yarn of step S2) while applying twisting to the woven yarn. In this step, in order to balance with the first twisting step, the covering yarns may be supplied while adding an optimal TPM in a certain direction.

In one embodiment, the second covering yarn is a yarn made of chemical fibers or natural fibers, and the materials described above may be used.

In one embodiment, the second covering yarn may be woven in an opposite direction to the first covering yarn.

In one embodiment, the second covering yarn may be applied at a twist level of 200 to 1,000 TPM or 250 to 800 TPM based on 50 to 300 deniers. This step may impart a higher TPM compared to the step of twisting the first covering yarn. Specifically, the twist level may be 150 deniers on average.

In one embodiment, the twist level of the second covering yarn may be higher than the twist level of the first covering yarn.

In one embodiment, step S3) may be performed at 90 to 140° C. or 100 to 120° C.

Figure 4A:
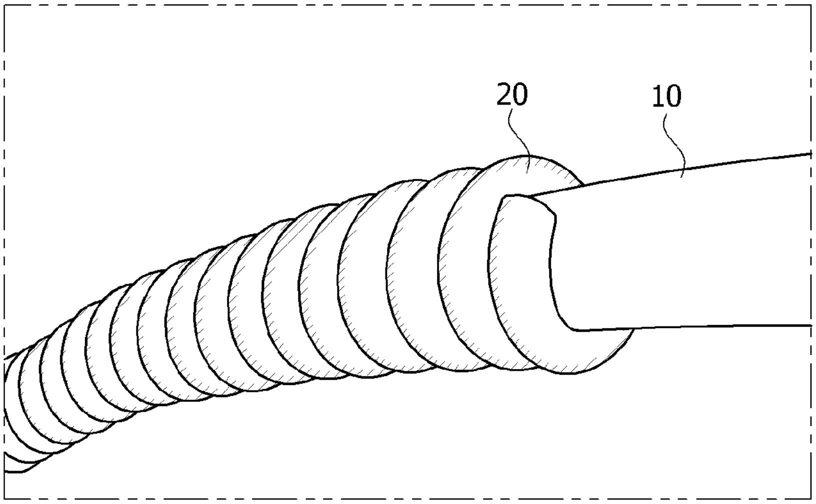
FIGS. 4A to 4C show examples of composite yarns composed of a slit yarn for a waste separator and a covering yarn.
Figure 4B:
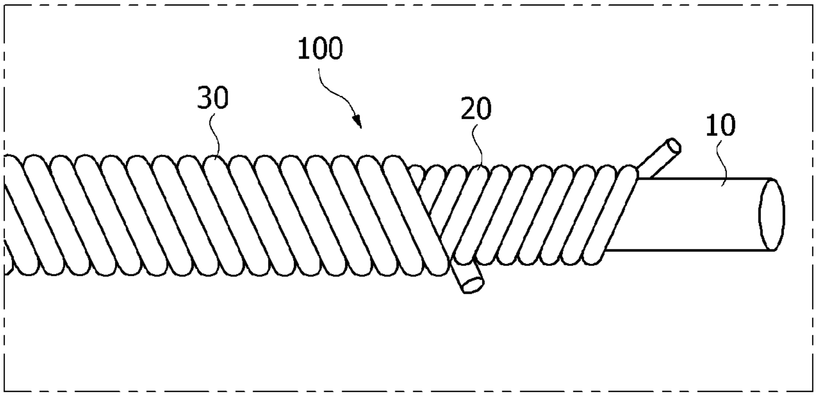
Figure 4C:
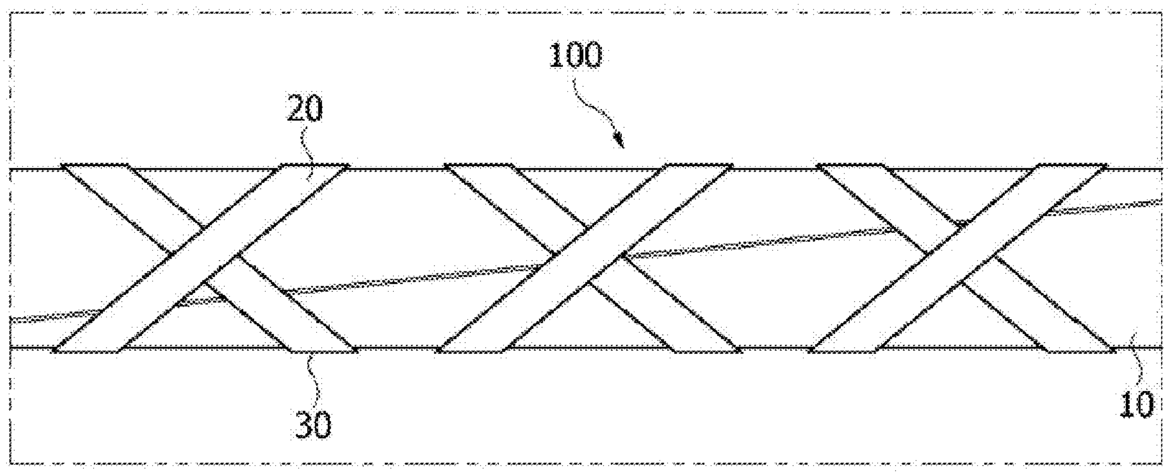

In the present invention, FIGS. 4A to 4C represent a composite yarn 100 composed of a slit yarn for a waste separator and a covering yarn. As shown in FIG. 4A, a first covering yarn 20 may be woven into a core yarn 10, and a second covering yarn 30 may be woven after covering with the first covering yarn.

Hereinafter, the present invention will be described in detail with reference to examples thereof. Therefore, it should be understood that the following examples are only intended to illustrate the present invention, and are not intended to limit the scope of the present invention. These examples are only provided to complete the disclosure of the present invention and fully inform a person with ordinary skill in the art to which the present invention pertains of the scope of the invention. Accordingly, the present invention is defined only by the scope of the appended claims.

EXAMPLES

Example 1: Manufacture of Composite Yarn (1) Preparation of Core Yarn

An SKIET ceramic coated separator (thickness: approximately 15 μm), which is a separator that was overproduced and disposed of during a production process of secondary battery manufacturing, was prepared.

The separator was cut into 2 mm using a separator-dedicated slitting cutter (slitter fix device) to manufacture slit yarns, and the manufactured slit yarns were used as a core yarn.

The manufacture of the core yarn was able to be performed in the same manner as the method of manufacturing a yarn as described in Korean Patent No. 10-2607185 (Title of the Invention: Yarn manufacturing system by recycling secondary battery separator and method using the same).

(2) Preparation of Covering Yarns 150 denier polyester was used as the first covering yarn.

150 denier polyester was used as the second covering yarn.

(3) Manufacture of Composite Yarn

A twist of 100 TPM was applied to the core yarn prepared in the section (1) through a drawing process. The core yarn was drawn to 1.1 to 1.2 DR. Thereafter, heat treatment was performed at a temperature of 100 to 110° C. for 0.2 to 0.3 hours.

The first covering yarn was woven into the core yarn while applying twisting to the core yarn. In this case, the weaving was performed at 100 to 120° C.

Next, the second covering yarn was woven into the woven yarn while providing a twist level of 300 TPM. In this case, the weaving was performed at 100 to 120° C.

Through this step, a composite yarn having a total denier size of approximately deniers was manufactured.

In this case, the composition ratio of the core yarn and the covering yarns was 55:45% by weight, and the core yarn was doubly covered so that the first covering yarn had an S twist and the second covering yarn had a Z twist.

FIG. 1 is an image of the composite yarn manufactured in Example 1.

Comparative Example 1

A slit yarn was manufactured using a conventional slitting cutter.

Experimental Example 1: Evaluation of Slit Yarn According to Type of Slitting Cutter The slit yarns manufactured in section (1) of Example 1 and Comparative Example 1 were evaluated.

Figure 2A:
FIG. 2A (Prior Art)
FIG. 2A is an image of a conventional slitting cutter.

FIG. 2A shows an image of a conventional slitting cutter used in Comparative Example 1 and a slitting cutter for a separator used in Example 1.

Figure 3:
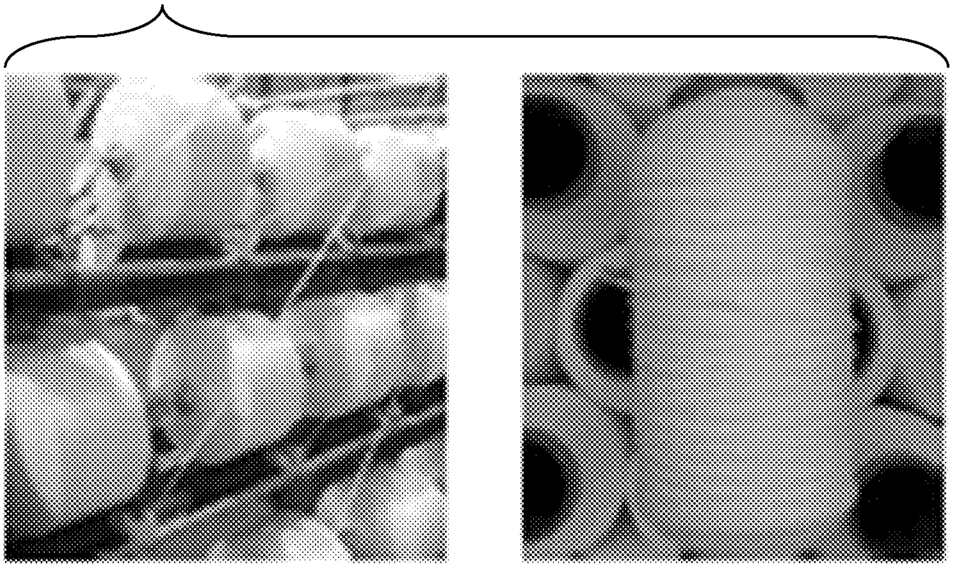
FIG. 3 is an image of a wound slit yarn for a waste separator.

Also, FIG. 3 shows an image of the slit yarn, that is, the core yarn, manufactured in Example 1.

As shown in FIG. 2A, when the conventional slitting cutter was used, it can be seen that the separator was damaged by the slitting tension and the slit spacing was uneven due to slip.

Figure 2B:
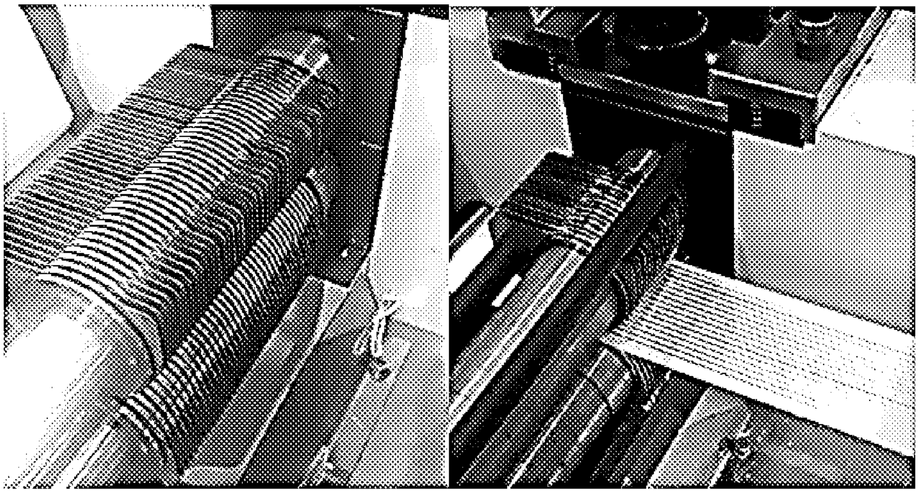
FIG. 2B is an image of a slitting cutter according to the present invention.

On the other hand, it can be seen that the separator according to Example 1 was able to perform slitting at regular intervals without errors (FIGS. 2B and 3).

Because the slitting cutter used in the examples uses a method in which the separator is slit by an active rotation module of a blade equipped with a micro-cutter, rather than the conventional passive method in which the separator passes through a fixed cutter, it is possible to slit yarns at regular intervals without any errors.

Experimental Example 2: Strength Measurement

The strength was measured by the method of examining the strength of a yarn according to the KSK 0412:2022 test method.

The strength of the composite yarn manufactured in Example 1 is 1.58 (g/d).

Within the above strength range, the composite yarn has the effect of imparting stable weaving properties without causing yarn breakage.

Experimental Example 3: Elongation Measurement

The elongation was measured by the method of examining the elongation (%) of a yarn according to the KSK 0412:2022 test method.

The elongation of the composite yarn manufactured in Example 1 is 22.5%.

Within the above elongation range, the composite yarn has the effect of imparting drape properties by imparting an appropriate elongation to the woven fabrics.

Experimental Example 4: Dimensional Change Rate Measurement

The dimensional change rate was measured by a method of drying the resultant fabric woven into the separator yarn at a washing temperature of approximately 41° C. on a clothesline according to the KSK ISO 6330:2012,5B test method.

The dimensional change rate of the composite yarn manufactured in Example 1 is 0.5.

Within the above dimensional change rate range, the composite yarn has the effect of imparting a stable washing shrinkage rate.

The present invention can provide an environmentally friendly functional yarn by recycling a separator for a secondary battery coated with a heat-resistant material into yarn, and has the effect of saving enormous costs in the process of separately disposing of the separator.

Also, because the separator for a secondary battery of the present invention has lightweight properties due to its low specific gravity, various recycled products requiring the lightweight properties can be produced using the manufactured yarn.

In addition, because the composite yarn manufactured by the present invention has excellent strength and a low dimensional change rate due to the presence of the core yarn, there is almost no morphological deformation in the final fabric product. Further, because the composite yarn is a yarn manufactured by weaving a functional covering yarn into the core yarn, the composite yarn can achieve flame retardancy, water repellency, stain resistance, and heat retention functions, and can implement various designs by combining design covering yarns.

BRIEF DESCRIPTION OF MAIN PARTS

100: composite yarn
10: core yarn
20: first covering yarn
30: second covering yarn

What is claimed is:

1. A composite yarn having one or more covering yarns covering a core yarn,
the core yarn being formed by twisting a slit yarn having a width of 0.5 to 3 mm,
the core yarn having 50 to 300 twists per meter (TPM),
the slit yarn including an ultrahigh molecular weight polyethylene (UHMWPE) layer; and a heat-resistant coating layer formed on one surface of the UHMWPE layer.

2. The composite yarn of claim 1, wherein the heat-resistant coating layer includes inorganic particles selected from the group consisting of ceramics, aluminum hydroxide, magnesium hydroxide, calcium oxide, magnesium oxide, alumina, Boehmite, aluminum hydroxide, titanium oxide, silica, zinc oxide, and clay; a heat-resistant polymer resin selected from the group consisting of polyacrylonitrile, polysulfone, polyamide, polytetrafluoroethylene, polyurethane, polyaramid, and cellulose acetate; or a combination of two or more types thereof.

3. The composite yarn of claim 1, wherein the content of the heat-resistant coating layer in the core yarn ranges from 20 to 50 parts by weight based on 100 parts by weight of the UHMWPE layer.

4. The composite yarn of claim 1, wherein the slit yarn is manufactured by cutting a waste separator film discarded during a process of manufacturing a secondary battery to a width of 0.5 to 3 mm.

5. The composite yarn of claim 1, wherein the slit yarn has a thickness of 5 to 30 μm.

6. The composite yarn of claim 1, wherein the core yarn has a linear density of 100 to 400 denier.

7. The composite yarn of claim 1, wherein the covering yarns are yarns made of chemical fibers or natural fibers,
the chemical fibers are one or two or more composite materials selected from the group consisting of polyester, nylon, acryl, rayon, and polyethylene including UHMWPE, and
the natural fibers are one or two or more composite materials selected from the group consisting of cotton, wool, and silk.

8. The composite yarn of claim 1, wherein the covering yarns have a linear density of 50 to 300 denier.

9. The composite yarn of claim 1, wherein the core yarn is covered with two covering yarns,
the first covering yarn has a twist level of 200 to 800 TPM based on 150 denier, and
the second covering yarn has a twist level of 200 to 1,000 TPM based on 150 denier.

10. The composite yarn of claim 9, wherein the first covering yarn has an S-direction or Z-direction twist,
the second covering yarn has an S-direction or Z-direction twist, and
the first covering yarn and the second covering yarn have different twist directions.

11. The composite yarn of claim 1, wherein the composite yarn has a linear density of 150 to 700 denier, a strength of 1 to 30 g/d, an elongation of 10 to 30%, and a dimensional change rate of 0.5 to 10%.

* * * * *